ively in opposite directions, one of the side members being structurally integral with the outer cantalevered toothed arm for flexing in concert with the flexing of the outer toothed arm during snapping closed of the clamp or opening thereof.

United States Patent [19]

Wenk

[11] 4,214,351
[45] Jul. 29, 1980

[54] SNAP-ON CLAMP

[76] Inventor: Raymond C. Wenk, 340 N. Walkup, Crystal Lake, Ill. 60014

[21] Appl. No.: 933,942

[22] Filed: Aug. 15, 1978

[51] Int. Cl.² ............................................. A44B 21/00
[52] U.S. Cl. ................................................ 24/255 SL
[58] Field of Search ........... 24/255 SL, 20 TT, 16 PB

[56] References Cited

U.S. PATENT DOCUMENTS

| | | | |
|---|---|---|---|
| 210,560 | 12/1878 | Robertshaw . | |
| 234,799 | 11/1880 | Neely . | |
| 382,577 | 5/1888 | Schimper . | |
| 431,916 | 7/1890 | Rich . | |
| 435,887 | 9/1890 | Ellithorp . | |
| 455,967 | 7/1891 | Lusk et al. . | |
| 673,382 | 5/1901 | Chafee . | |
| 712,765 | 11/1902 | Cole | 24/20 TT |
| 751,329 | 2/1904 | McLaughlin | 24/20 TT |
| 823,591 | 6/1906 | Eager | 24/20 TT |
| 929,910 | 8/1909 | Wood . | |
| 1,003,907 | 9/1911 | Hoffman . | |
| 1,261,221 | 4/1918 | Dutcher . | |
| 1,330,737 | 2/1920 | Coffman . | |
| 1,414,731 | 5/1922 | Englund . | |
| 1,441,154 | 1/1923 | Johnson | 24/20 TT |
| 1,687,854 | 10/1928 | Anderson . | |
| 1,804,725 | 5/1931 | Walker . | |
| 2,374,541 | 4/1945 | Hartman . | |
| 2,476,586 | 7/1949 | Darash . | |
| 2,881,762 | 4/1959 | Lowrie . | |
| 2,884,214 | 4/1959 | Wrobel . | |
| 2,915,267 | 12/1959 | Kaysing . | |
| 2,968,470 | 1/1961 | Pellerito et al. . | |
| 2,996,285 | 8/1961 | Johnson . | |
| 3,147,754 | 9/1964 | Koessler . | |
| 3,204,426 | 9/1969 | Armstrong | 24/20 TT |
| 3,229,998 | 1/1966 | Pennington . | |
| 3,247,852 | 4/1966 | Schneider . | |
| 3,258,819 | 7/1966 | Weckesser . | |
| 3,266,109 | 8/1966 | Thomas | 24/20 TT |
| 3,432,129 | 3/1969 | Santucci . | |
| 3,516,631 | 6/1970 | Santucci . | |
| 3,517,702 | 6/1970 | Mueller et al. | 24/16 PB |
| 3,605,200 | 9/1971 | Vallinotto | 24/20 TT |
| 3,629,912 | 12/1971 | Klopp . | |
| 3,633,947 | 1/1972 | Nelson | 24/255 SL |
| 3,633,947 | 1/1971 | Nelson . | |
| 3,701,505 | 10/1972 | Klumpp . | |
| 3,757,031 | 9/1973 | Izraeli | 24/255 SL |
| 3,809,371 | 5/1974 | Martini . | |
| 3,913,187 | 10/1975 | Okuda . | |
| 3,925,851 | 12/1975 | Bevans | 24/20 TT |

FOREIGN PATENT DOCUMENTS

| | | |
|---|---|---|
| 474725 | 8/1974 | Australia . |
| 1022820 | 3/1966 | United Kingdom . |

*Primary Examiner*—William H. Schultz
*Attorney, Agent, or Firm*—Hosier, Niro & Daleiden

[57] ABSTRACT

A snap-on clamp is disclosed for securely fastening one object to another, such as fastening a flexible hose about a pipe, a nipple, or the like, and includes an open-ended, substantially annular band having a pair of opposed, interlockable members disposed at the open ends thereof. One of the interlockable members includes a generally arcuate jaw defined by the outer cantalevered toothed arm having a plurality of teeth along the radial inside thereof, and an inner arm spaced radially inwardly of the outer arm defining a mouth therebetween. A pair of radially extending support brace members are disposed between the arms on the sides thereof at the end of the jaw opposite the open end of the mouth defined thereby. The brace members and the upper and lower arms define a through hole therebetween. The other interlockable member comprises a toothed tongue positionable within the mouth between the arms of the one interlockable member and passable through said through hole. The tongue has a plurality of teeth along the radial outside thereof oriented for interlocking engagement with the teeth of the outer arm of the one interlockable member for closing the clamp, whereby the clamp can be opened by lifting the outer cantalevered arm of the one interlockable member radially outwardly of the tongue to disengage the respective teeth. A pair of depending side legs are formed at the end of the upper arm of the one interlockable member to guide the tongue into the mouth defined by the upper and lower arms. In one form of the invention, a pair of radially extending side members are disposed between the arms of the one interlockable member and bowed axially outwardly therefrom. The side members are resiliently flexible so as to lift the arcuate jaw defined by the outer toothed arm of the one interlockable member out of engagement with the tongue defined by the other interlockable member upon compressing the flexible side members axially inwardly toward one another to facilitate opening the clamp.

42 Claims, 7 Drawing Figures

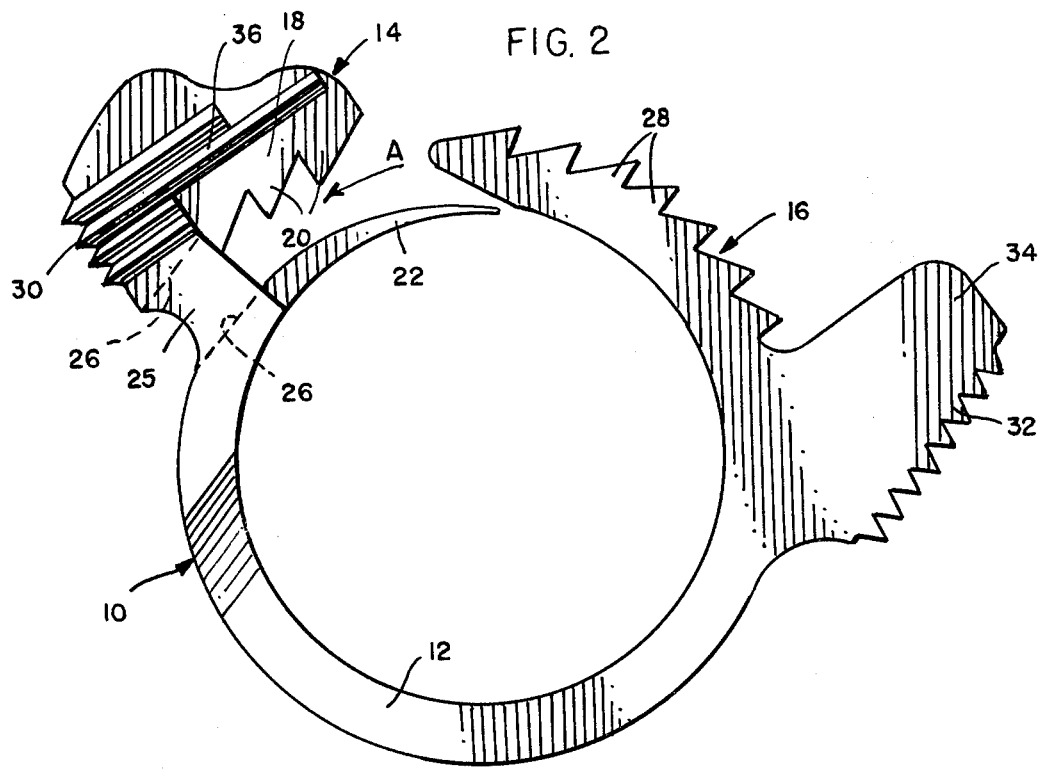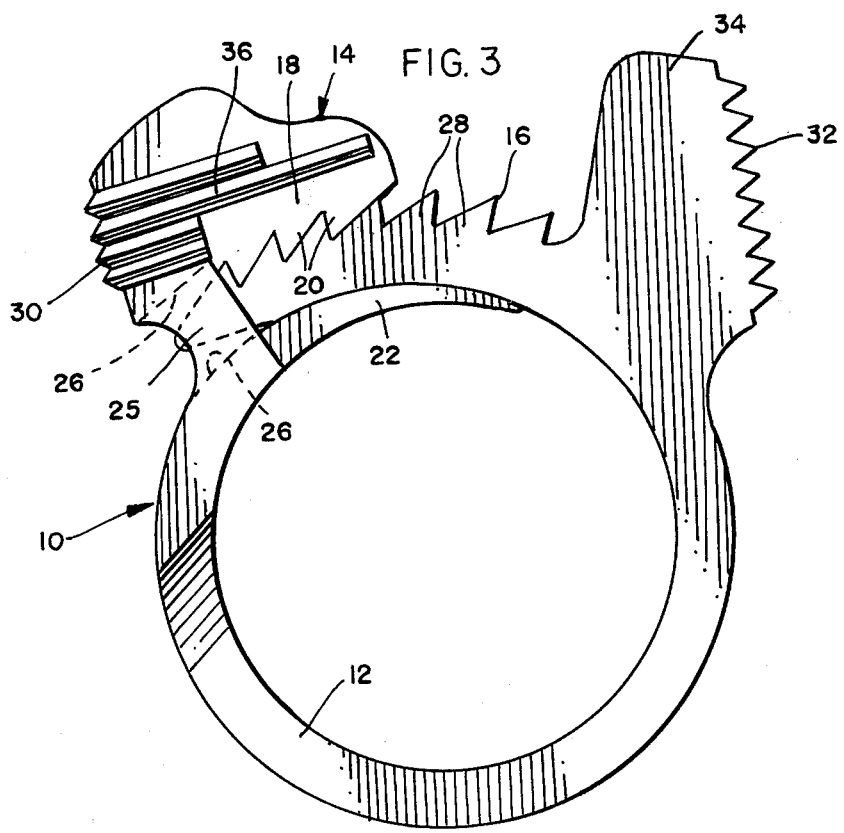

SNAP-ON CLAMP

BACKGROUND OF THE INVENTION

The present invention relates to adjustable clamps for securely fastening one object to another and more particularly to clamps for securely fastening a flexible hose about a pipe, a nipple, or the like, by means of an adjustable band which is adapted to be adjusted and closed by a pair of interlocking members. In particular, the present invention relates to an improved snap-on clamp of the character described which is capable of withstanding high internal hose pressure, is adjustable to fit hoses having widely varying outer diameters for a given inner diameter hose fit, and which is readily and easily unlocked to open the clamp.

In the construction and manufacture of apparatus which include gases or liquids flowing through partially flexible lines, installation of hose pieces between pipe connections is often necessary. In many instances, it is desirable to simply and quickly clamp the hose onto a nipple at the end of a pipe line. For purposes of servicing, repairing, or cleaning of such lines, it is also desirable to be able to disconnect the normally clamped on hose without damaging either the hose or the clamp. Therefore, a removable clamp of simple construction and operation is necessary for such purposes.

Another desirable feature in many instances is to be able to reuse such clamps. In the automobile industry, for example, short flexible hose pieces are inserted into pipe connections which conduct air or liquids. It is also customary in the automotive industry to cover drive shafts by means of flexible, bellows-like hose pieces in order to protect the shafts against the environment. These hose pieces must generally be disconnected for purposes of repair and/or servicing, and the ability to reuse the hose clamps would result in substantial cost savings. Conversely, it may also be desirable to clamp a hose onto a pipe or nipple in such a fashion so as to disconnect the clamp hose without destroying the clamp.

In many situations, such as in the above-mentioned automotive industry, oftentimes the ends of hoses must be clamped in various positions where access to the clamp is extremely limited so as to the space available in order to manipulate the clamp for unlocking or opening purposes. This is a particular problem in using many prior art clamps which can be unlocked only by manipulating interlocking members of the clamp in an axial direction relative to the clamp hose. It can be seen that in working with automobiles or other machinery or the like, the axial space necessary to open the clamp oftentimes is not available. The present invention provides a new and improved clamp of the character described which is easily opened by manipulation of the clamp in a radial direction.

Examples of snap-on clamps of the general type to which the present invention relates are shown in my U.S. Pat. applications Ser. No. 745,661, filed Nov. 29, 1976, and No. 849,684, filed Nov. 8, 1977, which issued as U.S. Pat. No. 4,128,918. These applications and patent are incorporated herein by reference. These applications point out the limitation of previous snap-on adjustable hose clamps which, while being adjustable and readily fastened to a flexible hose, the prior clamps are limited with respect to the range of outer hose diameters which a single clamp is capable of being secured. The limitations of such prior art clamps is due in part, to the tooth structure of the clamp, particularly with respect to the size and number of teeth in relation to the annular band configuration. Such a limitation, of course, poses considerable problems since the manufacture of hoses is generally based on inner diameter sizing. Since such hoses fit over standard sized nipples or pipe ends, the inner diameters of the hoses are generally maintained in accordance with strict size tolerances. The thickness and outer diameters of such hoses, however, generally do not have strict size tolerances and, therefore, vary widely for any inner diameter size. Thus, to meet all possible situations, users or installers of such hoses have been required in the past to stock many sizes of clamps and such a stock has resulted in the inability at times to properly service certain situations where the available hose required a size of clamp which was out of stock or not stocked at all, even though other clamps suitable for the same inner diameter size hose were available. The present invention includes certain of these features of my aforesaid applications regarding teeth sizes and dimensions as well as diameter sizing.

SUMMARY OF THE INVENTION

The present invention, therefore, is directed to providing a new and improved snap-on clamp which overcomes the above-mentioned deficiencies of previously available hose clamps.

A principal object of the present invention is to provide an improved clamp having a simple and inexpensive construction for use in connecting hoses or the like to other objects such as about a pipe, a nipple, or the like.

Another object of the invention is to provide an improved clamp of the character described which is easily unlocked for replacement purposes, replacement of the hoses with which the clamp is utilized, or for repair purposes.

In the exemplary embodiment of the invention, a clamp is provided which is generally in the form of an open-ended substantially annular band having a pair of opposed, interlockable members disposed at the open ends thereof. One of the interlockable members includes a generally arcuate jaw defined by an outer cantalevered toothed arm having a plurality of teeth along the radial inside thereof, and an inner arm spaced radially inwardly of the outer arm defining a mouth therebetween. The other interlockable member comprises a toothed tongue positionable within the mouth between the arms of the one interlockable member and has a plurality of teeth along the outside thereof oriented for interlocking engagement with the teeth of the outer arm of the one interlockable member for closing the clamp, whereby the clamp can be opened by lifting the outer cantalevered arm of the one interlockable member radially outwardly of the tongue defined by the other interlockable member to disengage the respective teeth thereof.

The inner arm of the one interlockable member is sufficiently tapered and cooperates with the tongue of the other interlockable member to form a substantially continuous inner circumferential surface in any closed position of the clamp. The inner circumferential surface forms a substantially true circle and the center axis of the clamp is coincident with the center of the circle when the clamp is in a closed position. The inner arm of the one interlockable member also is resilient for developing opposing forces between the tongue and the outer arm of the one interlockable member to maintain the teeth in engagement after initial engagement of the first teeth of the tongue and outer arm.

A pair of radially extending side braces are disposed between the arms of the one interlockable member at the ends of the arms opposite the open end of the mouth defined thereby. The side braces, in combination with the upper and lower arms of the one interlockable member, define a through hole for accommodating the tongue of the other interlockable member so that the clamp can accommodate hoses having a wide range of outside diameters.

In order to facilitate lifting of the outer cantilevered arm of the one interlockable member radially outwardly of the tongue defined by the other interlockable member, the outer cantilevered arm is serrated along the sides thereof. In addition, radially outwardly extending serrated shoulders are provided on the band spaced from and facing away from the open ends thereof to facilitate closing the clamp about a hose or the like.

Another feature of the invention, as shown in another embodiment thereof, includes a pair of side legs depending from the upper arm of the one interlockable member at the open end of the mouth defined thereby to guide the tongue of the other interlockable member into the mouth.

In an alternate embodiment of the invention, a pair of radially extending side members are disposed between the arms of the one interlockable member and are bowed axially outwardly therefrom. The side members are resiliently flexible so as to lift the arcuate jaw defined by the outer toothed arm of the one interlockable member out of engagement with the tongue defined by the other interlockable member upon compressing the resiliently flexible side members axially inwardly toward one another to thereby open the clamp.

Other objects, features and advantages of the invention will be apparent from the following detailed description taken in connection with the accompanying drawings.

DESCRIPTION OF THE DRAWINGS

FIG. 2 is a side elevational view of the clamp of FIG. 1 in an open position;

FIG. 3 is a side elevational view similar to that of FIG. 2 of the clamp in a closed position;

DETAILED DESCRIPTION OF THE INVENTION

Figure 1:
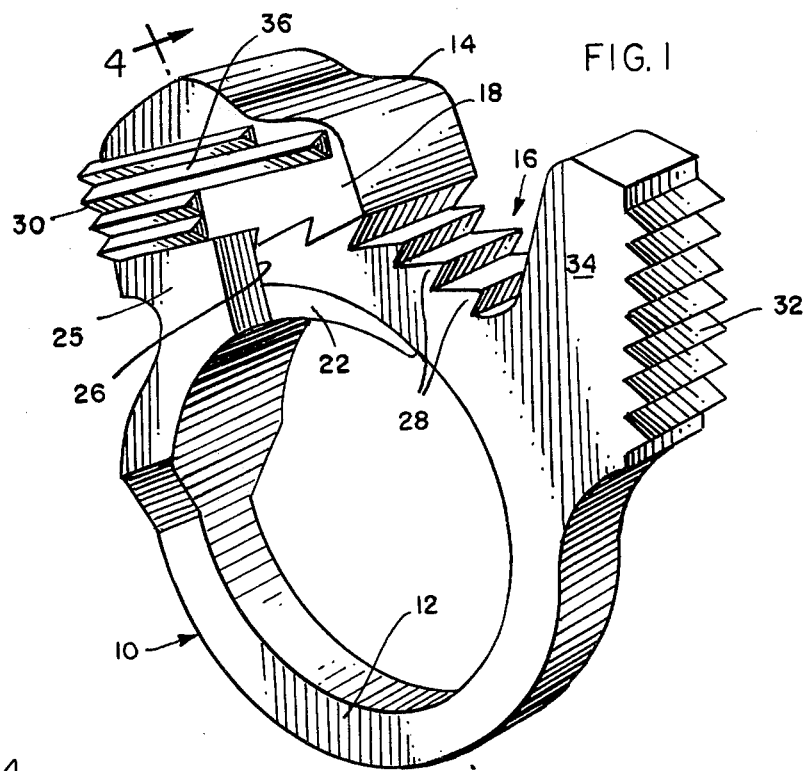
FIG. 1 is a perspective view of a clamp embodying certain features of the present invention, and illustrating the clamp in a closed position and employed with a relatively small diameter band.

Referring to the drawings in greater detail, there is illustrated a clamp, generally designated 10, which embodies the novel features of the present invention. The clamp includes an open-ended, substantially annular band 12 fabricated of plastic or the like and having a pair of integral, opposed interlockable members, generally designated 14 and 16, disposed at its opposite ends for securing about a hose or the like to fasten the hose about a pipe, a nipple, or similar related objects. The first interlockable member 14 includes a generally arcuate jaw defined by an outer cantilevered toothed arm 18 having a plurality of radially inwardly protruding teeth 20 along the inside thereof. An inner arm 22 is spaced radially inwardly of the outer arm 18 defining a mouth 24 therebetween. The outer and inner arms 18 and 22, respectively, are joined together by a pair of radially extending side braces 25 formed integrally with the arms 18 and the outside of the inner arm 22 to define a through hole 26 opposite the open end of the mouth 24, spaced from the respective open end of the band 12.

Figure 4:
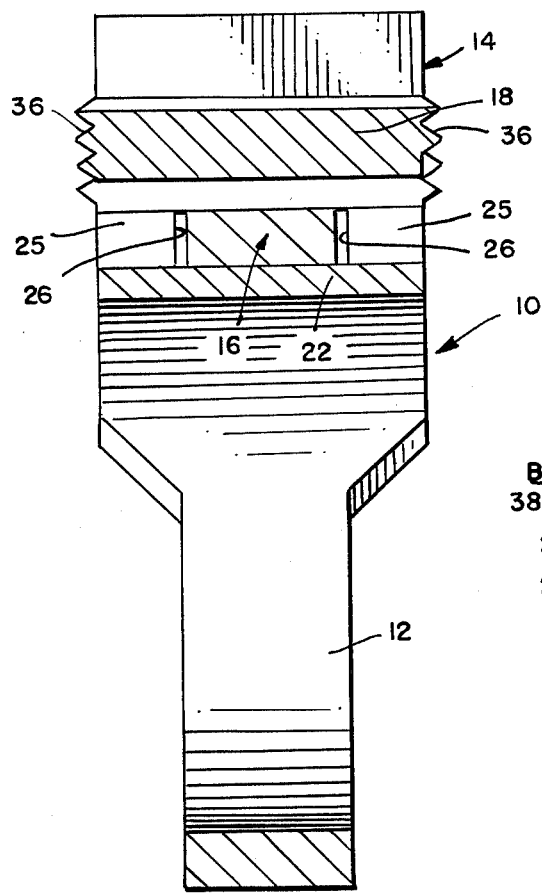
FIG. 4 is a generally vertical sectional view, on an enlarged scale, taken generally along line 4—4 of FIG. 1.

The other or second interlockable member 16 comprises a toothed tongue positionable within the mouth 24 of the interlockable member 14 between the arms 18 and 22 thereof. The tongue has a plurality of radially outwardly protruding teeth 28 along the outside thereof oriented for interlocking engagement with the teeth 20 of the toothed arm 18 of the interlockable member 14 for closing the clamp as shown in FIGS. 1 and 4.

The inner arm 22 of the interlockable member 14 is relatively thin to provide resiliency for developing opposing forces between the tongue defined by the interlockable member 16 and the outer arm 18 of the interlockable member 14 to maintain the teeth 20, 28 in engagement particularly during engagement of the first teeth of the tongue and arm. The inner arm 22 also is sufficiently tapered and cooperates with the tongue of the interlockable member 16 to form a substantially continuous inner circumferential surface in any closed position of the clamp. The inner circumferential surface forms a substantially true circle, with the central axis of the clamp being coincident with the center axis of the circle when the clamp is in a closed position. The dimensional details of forming the clamp, such as by standard injection molding techniques, to establish certain angular relationships for the clamp so that the band is in a substantially true circular form, having a true center when the clamp is in its initial closed position, is shown in my aforesaid co-pending patent application Ser. No. 849,684 which is incorporated herein by reference.

The tooth structure of the teeth 20 and 28 on the interlockable members 14 and 16, respectively, particularly the relationships between the height and angular structure of the teeth, also is disclosed in my co-pending patent application Ser. No. 849,684 and is incorporated herein by reference.

In order to facilitate closing the clamp 10 of the present invention, a radially outwardly extending serrated shoulder, as at 30, is formed on the interlockable member 14, and a similar radially outwardly extending serrated shoulder 32 is formed on the band 12 adjacent the other interlockable member 16. The shoulder 32 forms one side of a boss 34 formed integral with and protruding radially outwardly of the band 12. The shoulders 30, 32 are angularly spaced and face away from the open ends of the band 12 to facilitate closing the clamp by hand or by suitable implements such as a pliers or the like. In closing the clamp, the tongue formed by the interlockable member 16 is forced inwardly in the direction of arrow A (FIG. 2) until the teeth 20 and 28 of the interlockable members 14 and 16, respectively, are interengaged. The clamp is securely tightened about a hose or the like by continued pressure on the shoulders 30 and 32 of the interlockable member 14 and 16, respectively, and the tongue can pass into and through the through hole 26 of the interlockable member 14, as shown in FIG. 3. The lower arm 22 of the interlockable member 14, being resilient as described above, develops opposing forces between the interlockable member 16 and the outer arm 18 of the interlockable member 14 to maintain the teeth 20, 28 in engagement particularly during initial engagement of the first teeth of the interlockable members.

In order to facilitate opening the clamp, the sides of the outer toothed arm 18 of the interlockable member 14 are serrated, as at 36, to facilitate lifting of the outer arm 18 away from the tongue 16 to disengage the respective teeth 20 and 28 thereof. The serrations 36 facilitate grasping the outer arm 18 or cooperate with a pliers of similar implement.

Figure 5:
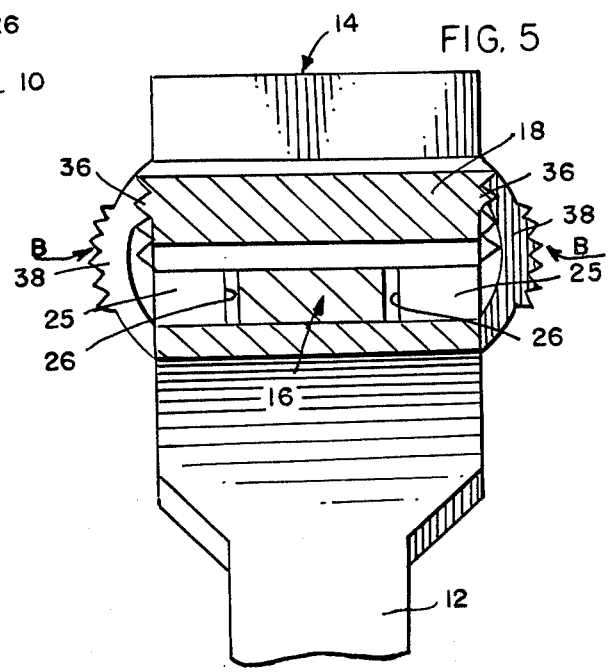
FIG. 5 is a vertical sectional view similar to that of FIG. 4 showing a modified clamp having resiliently flexible side members to facilitate opening the clamp.

Referring to FIG. 5, a modification of the invention is shown in which a pair of radially extending side members 38 are disposed between the arms 18 and 22 of the interlockable member 14, and the side members 38 are bowed axially outwardly as shown in FIG. 5. The side members 38 are resiliently flexible and molded integral with the arms 18 and 22 so as to lift the outer arm or arcuate jaw 18 radially outwardly upon compressing the side members axially toward one another, generally in the direction of arrows B, to facilitate opening the clamp.

Figure 6:
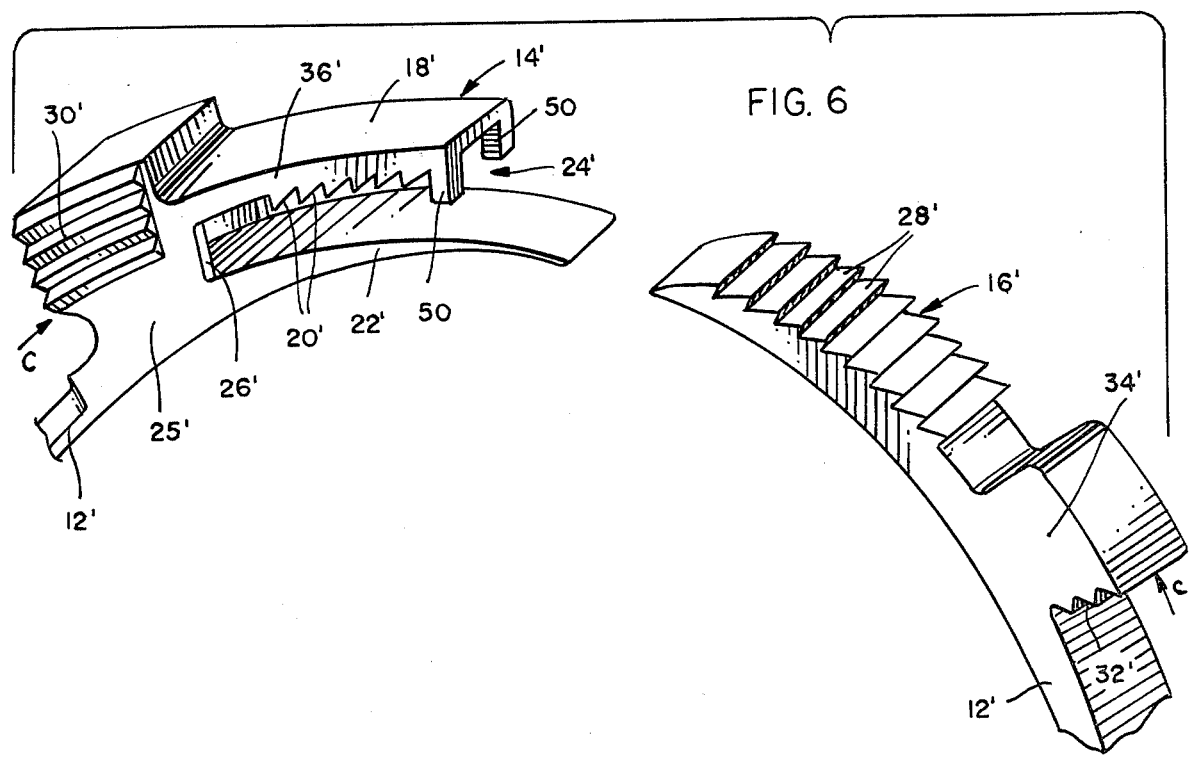
FIG. 6 is a fragmented perspective view of the clamp employed with a relatively large diameter band, and including guide legs on the one interlockable member.
Figure 7:
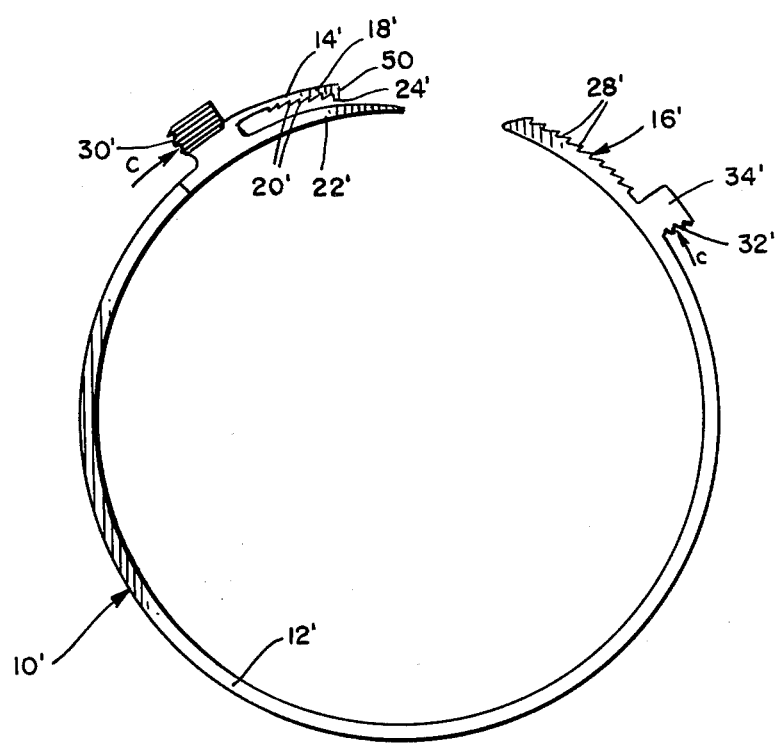
FIG. 7 is an enlarged side elevational view of the clamp of FIG. 6.

Referring to FIGS. 6 and 7, a clamp in accordance with the present invention is shown and includes guide means at the mouth of the one interlockable member for guiding the tongue defined by the other interlockable member into the mouth particularly during initial closing of the clamp. The clamp also is shown employed at the ends of a band considerably larger than that shown in FIGS. 1 through 4. More particularly, the clamp is generally designated by the numeral 10' and includes an open-ended, substantially annular band 12' fabricated of plastic or like material and having a pair of integral, opposed interlockable members, generally designated 14' and 16'. As with the clamp shown in FIGS. 1 through 4, the first interlockable member 14' includes an arcuate jaw defined by an outer cantilevered toothed arm 18' having teeth 20' along the inside thereof, and an inner relatively thin, resilient arm 22'. The outer and inner arms, 18' and 22', respectively, define a mouth 24' therebetween. The outer and inner arms 18' and 22', respectively, are joined together by a pair of radially extending side braces 25' formed integrally with the arm. The side braces 25' combine with the inside of the outer arm 18' and the outside of the inner arm 22' to define a through hole 26' opposite the open end of the mouth 24', spaced from the respective open end of the band 12'.

The other interlockable member 16' of the clamp shown in FIGS. 6 and 7 comprises a toothed tongue similar to that shown in FIGS. 1 through 4 and which is positionable within the mouth 24' of the interlockable member 14' between the arms 18' and 22' thereof. The tongue has a plurality of radially outwardly protruding teeth 28' along the outside thereof oriented for interlocking engagement with the teeth 20' of the toothed arm 18' of the interlockable member 14' for closing the clamp as shown in FIGS. 1 and 3.

With the form of the clamp 10' shown in FIGS. 6 and 7, guide means is provided on the interlockable member 14' to guide the tongue defined by the interlockable member 16' into the mouth 24' of the interlockable member 14'. More particularly, a pair of side legs 50 are formed in the end of the upper arm 18' of the interlockable member 14'. Thus, the mouth 24' of the interlockable member 14' is defined between the side legs 50 above and below the lower arm 22' and upper arm 18', respectively, of the interlockable member 14'. A user of the clamp 10' oftentimes finds it necessary to employ the clamp about a hose or the like in very confined positions where, in fact, the clamp cannot even be seen during opening and closing thereof about a hose. The side legs 50 aid the user in guiding the toothed tongue defined by the interlockable member 16' into the mouth 24' defined by the interlockable member 14'. Although the drawings are somewhat schematic, the legs 50 are spaced slightly wider than the tongue defined by the interlockable member 16' so that the tongue can enter the mouth 24'.

As with the clamp shown in FIGS. 1 through 4, in order to facilitate closing the clamp 10' shown in FIGS. 6 and 7, a radially outwardly extending serrated shoulder, as at 30', is formed on the interlockable member 14', and a similar radially outwardly extending serrated shoulder 32' is formed on the band 12' adjacent the other interlockable member 16'. The shoulder 32' forms one side of a boss 34' formed integral with and protruding radially outwardly of the band 12'. As with the clamp shown in FIGS. 1 through 4, the shoulders 30' and 32' are angularly spaced and face away from the open ends of the band 12' to facilitate closing the clamp 10' by hand or by suitable implement such as a pliers or the like.

As with the clamp 10 shown in FIGS. 1 through 4, the clamp 10' shown in FIGS. 6 and 7 includes serrations 36' along the sides of the outer toothed arm 18' of the interlockable member 14', to facilitate lifting the outer arm 18' away from the tongue defined by the interlockable member 16' to disengage the respective teeth 20' and 28' thereof. The serrations 36' facilitate grasping the outer arm 18' or cooperate with a pliers or similar implement. In addition, although not shown in the drawings, it is contemplated that the legs 50, for molding reasons, can extend substantially all the way to the top of arm 22' although being separate therefrom.

It should be noted that in using the clamp of the present invention with a relatively large diameter band, such as the clamp 10' and the band 12' shown in FIGS. 6 and 7, forces employed against the serrated shoulders 30' and 32' are substantially tangentially directed as indicated by the arrows C. Thus, most of the closing forces are directed toward the direction of movement of the tongue defined by the interlockable member 16' generally in a straight line into the mouth 24' of the interlockable member 14'. This is particularly important when using the clamp with large diameter bands for respectively large diameter hoses or the like, to eliminate, as much as possible, radial forces which might damage the clamp and/or the hose or other object with which the clamp is employed. In addition, it can be seen that the boss 34' of the clamp 10' shown in FIGS. 6 and 7 has a relatively smaller radial dimension than the boss 34 of the clamp 10 shown in FIGS. 1 through 4. This dimensioning is to preclude any possibility that the boss might be broken or deformed due to substantial closing forces required with larger sized bands for larger diameter hoses.

While in the foregoing specification a detailed description of the invention has been set forth for purposes of illustration, variations of the details herein given may be made by those skilled in the art without departing from the spirit and scope of the invention.

I claim:

1. A clamp comprising an open-ended substantially annular band having a pair of opposed, interlockable members disposed at the open ends thereof, one of said interlockable members including a generally arcuate jaw defined by an outer cantilevered toothed arm extending in a direction circumferentially of the band and having a plurality of teeth along the inside thereof and an inner arm spaced radially inwardly of said outer arm defining a mouth between said arms, said outer arm of said one interlockable member being radially movable independently of said inner arm and the sides of said outer arm being exposed for grasping to effect said movement, and the other of said interlockable members comprising a toothed tongue positionable within said mouth between the arms of said one interlockable member and having a plurality of teeth along the outside thereof oriented for interlocking engagement with the teeth of the toothed arm of said one interlockable member for closing the clamp, whereby the clamp can be opened by lifting the outer cantilevered arm of said one interlockable member independently of the inner arm thereof and radially outwardly of said tongue to disengage the respective teeth thereof.

2. The clamp as described in claim 1 wherein the inner arm of said one interlockable member is sufficiently tapered and cooperates with said tongue to form a substantially continuous inner circumferential surface in any closed position of said clamp.

3. The clamp as described in claim 2 wherein said inner circumferential surface forms a substantially true circle with the central axis of said clamp being coincident with the center of said circle when the clamp is in a closed position.

4. The clamp as described in claim 1 wherein the inner arm of said one interlockable member is resilient for developing opposing forces between said tongue and the outer arm of said one interlockable member to maintain said teeth in engagement during initial engagement of the first teeth of said tongue and said outer arm.

5. The clamp as described in claim 1 including means defining radially outwardly extending serrated shoulders on said band spaced from and facing away from the open ends thereof to facilitate closing said clamp.

6. The clamp as described in claim 1 including a pair of radially extending brace members disposed between the sides of said arms of said one interlockable member defining a through hole between said brace members and said outer and inner arms for accommodating said tongue.

7. The clamp as described in claim 1 including a pair of radially extending side members disposed between the arms of said one interlockable member and bowed axially outwardly therefrom, said side members being resiliently flexible so as to lift the outer toothed arm of said one interlockable member out of engagement with the other of said interlockable members upon compressing said resiliently flexible side members axially inwardly toward one another to facilitate opening said clamp.

8. The clamp as described in claim 1 wherein the sides of said arcuate jaw defined by the outer toothed arm of said one interlockable member are serrated to facilitate lifting of said arcuate jaw out of engagement with the other of said interlockable members to open said clamp.

9. The clamp as described in claim 1 including guide means on said one interlockable member at the open end of the mouth defined thereby to guide said other interlockable member into said mouth.

10. The clamp as described in claim 9 wherein said guide means includes radially inwardly extending legs on the end of said outer arm of said one interlockable member.

11. The clamp as described in claim 10 wherein said legs are disposed at the extreme end of said outer arm at the open end of said mouth.

12. The clamp as described in claim 11 wherein said legs extend substantially radially across said mouth to the tongue defined by said other interlockable member.

13. A clamp comprising an open-ended substantially annular band having a pair of opposed interlockable members disposed at the open ends thereof, one of said interlockable members including an outer cantilevered arm and an inner arm spaced radially inwardly of said outer arm defining a mouth therebetween, the other of said interlockable members comprising a tongue positionable within said mouth between said arms of said one interlockable member, interengaging means between said interlockable members for locking said clamp in closed position, and a pair of radially extending side members disposed between said arms of said one interlockable member and bowed axially outwardly therefrom, said side members being resiliently flexible so as to lift said outer arm away from said tongue upon compressing said resiliently flexible side members axially inwardly toward one another to facilitate opening said clamp.

14. The clamp as described in claim 13 wherein said interengaging means between said interlockable members comprises complementary means between said tongue and the outer arm of said one interlockable member.

15. The clamp as described in claim 13 wherein said one interlockable member includes means defining a through hole at the ends of said arms opposite the open end of said mouth, through which said tongue can extend.

16. The clamp as described in claim 13 wherein the axially outer sides of said side members are serrated to facilitate grasping to compress the side members toward one another.

17. The clamp as described in claim 13 wherein the inner arm of said one interlockable member is sufficiently tapered and cooperates with said tongue to form a substantially continuous inner circumferential surface in any closed position of said clamp.

18. The clamp as described in claim 17 wherein said inner circumferential surface forms a substantially true circle with the central axis of said clamp being coincident with the center of said circle when the clamp is in a closed position.

19. The clamp as described in claim 13 including means defining radially outwardly extending serrated shoulders on said band spaced from and facing away from the open ends thereof to facilitate closing said clamp.

20. The clamp as described in claim 13 including a pair of radially extending brace members disposed between the sides of said arms of said one interlockable member defining a through hole between said brace members and said outer and inner arms for accommodating said tongue.

21. The clamp as described in claim 13 wherein the inner arm of said one interlockable member is resilient for developing opposing forces between said tongue and the outer arm of said one interlockable member.

22. The clamp as described in claim 13 including guide means on said one interlockable member at the open end of the mouth defined thereby to guide said other interlockable member into said mouth.

23. The clamp as described in claim 22 wherein said guide means includes radially inwardly extending legs on the end of said outer arm of said one interlockable member.

24. The clamp as described in claim 23 wherein said legs are disposed at the extreme end of said outer arm at the open end of said mouth.

25. The clamp as described in claim 24 wherein said legs extend substantially radially across said mouth to the tongue defined by said other interlockable member.

26. A clamp comprising an open-ended substantially annular band fabricated of plastic material and having a pair of opposed interlockable members disposed at the open ends thereof;
   one of said interlockable members including an outer cantilevered arm, an inner arm spaced radially inwardly of said outer arm defining a mouth therebetween facing toward the adjacent open end of the band, and a pair of radially extending side brace members disposed between the arms of said one interlockable member and defining a through hole between the arms and the side members behind said mouth;
   the other of said interlockable members comprising a tongue sequentially positionable first within said mouth between the arms of said one interlockable member and then passable through said through hole behind said mouth; and
   interengaging means between said interlockable members and in said mouth for locking said clamp in closed position.

27. The clamp as described in claim 26 wherein the inner arm of said one interlockable member is resilient for developing opposing forces between said tongue and the outer arm of said one interlockable member to maintain said teeth in engagement during initial engagement of the first teeth of said tongue and said outer arm.

28. The clamp as described in claim 26 including means defining radially outwardly extending serrated shoulders on said band spaced from and facing away from the open ends thereof to facilitate closing said clamp.

29. The clamp as described in claim 26 including a pair of radially extending side members disposed between the arms of said one interlockable member and bowed axially outwardly therefrom, said side members being resiliently flexible so as to lift the outer toothed arm of said one interlockable members out of engagement with the other of said interlockable members upon compressing said resiliently flexible side members axially inwardly toward one another to facilitate opening said clamp.

30. The clamp as described in claim 26 wherein the sides of the outer cantilevered arm of said one interlockable member are serrated to facilitate lifting of said outer arm out of engagement with the other of said interlockable members to open said clamp.

31. The clamp as described in claim 26 including guide means on said one interlockable member at the open end of the mouth defined thereby to guide said other interlockable member into said mouth.

32. The clamp as described in claim 31 wherein said guide means includes radially inwardly extending legs on the end of said outer arm of said one interlockable member.

33. The clamp as described in claim 32 wherein said legs are disposed at the extreme end of said outer arm at the open end of said mouth.

34. The clamp as described in claim 33 wherein said legs extend substantially radially across said mouth to the tongue defined by said other interlockable member.

35. A clamp comprising an open-ended substantially annular band having a pair of opposed, interlockable members disposed at the open ends thereof, one of said interlockable members including a generally arcuate jaw defined by an outer toothed arm extending in a direction circumferentially of the band and having a plurality of teeth along the inside thereof and an inner arm spaced radially inwardly of said outer arm defining a mouth between said arms, said outer arm of said one interlockable member being radially movable independently of said inner arm and the sides of said outer arm being exposed for grasping to effect said movement, means defining a through hole between said outer and inner arms, and the other of said interlockable members comprising a toothed tongue positionable within said mouth and through said hole between the arms of said one interlockable member and having a plurality of teeth along the outside thereof oriented for interlocking engagement with the teeth of the toothed arm of said one interlockable member for closing the clamp, means defining generally radially outwardly extending shoulders on said band spaced from the open ends thereof for closing said clamp, and whereby the clamp can be opened by lifting the outer arm of said one interlockable member independently of the inner arm thereof and radially outwardly of said tongue to disengage the respective teeth thereof.

36. The clamp as described in claim 35 wherein the inner arm of said one interlockable member is sufficiently tapered and cooperates with said tongue to form a substantially continuous inner circumferential surface in any closed position of said clamp.

37. The clamp as described in claim 36 wherein said inner circumferential surface forms a substantially true circle with the central axis of said clamp being coincident with the center of said circle when the clamp is in a closed position.

38. The clamp as described in claim 35 including a pair of radially extending side members disposed between the arms of said one interlockable member and bowed axially outwardly therefrom, said side members being resiliently flexible so as to lift the outer toothed arm of said one interlockable member out of engagement with the other of said interlockable members upon compressing said resiliently flexible side members axially inwardly toward one another to facilitate opening said clamp.

39. A clamp comprising an open-ended substantially annular band fabricated of plastic material and having a pair of opposed, interlockable members disposed at the open ends thereof, one of said interlockable members including a generally arcuate jaw defined by an outer toothed arm extending in a direction circumferentially of the band and having a plurality of teeth along the inside thereof and an inner arm spaced radially inwardly of side outer arm defining a mouth between said arms facing toward the adjacent open end of the band, said outer arm of said one interlockable member being radially movable independently of said inner arm and the sides of said outer arm being exposed for grasping to effect said movement, means defining a through hole between said outer and inner arms behind said mouth, and the other of said interlockable members comprising a toothed tongue sequentially positionable first within said mouth and then passable through said through hole behind said mouth between the arms of said one interlockable member and having a plurality of teeth along the outside thereof oriented for interlocking engagement with the teeth of the toothed arm of said one interlockable member for closing the clamp, means defining generally radially outwardly extending shoulders on said band spaced from the open ends thereof for closing said clamp, and whereby the clamp can be opened by lifting the outer arm of said one interlockable member independently of the inner arm thereof and radially outwardly of said tongue to disengage the respective teeth thereof.

40. The clamp as described in claim 39 wherein the inner arm of said one interlockable member is sufficiently tapered and cooperates with said tongue to form a substantially continuous inner circumferential surface in any closed position of said clamp.

41. The clamp as described in claim 40 wherein said inner circumferential surface forms a substantially true circle with the central axis of said clamp being coincident with the center of said circle when the clamp is in a closed position.

42. The clamp as described in claim 39 including a pair of radially extending side members disposed between the arms of said one interlockable member and bowed axially outwardly therefrom, said side members being resiliently flexible so as to lift the outer toothed arm of said one interlockable member out of engagement with the other of said interlockable members upon compressing said resiliently flexible side members axially inwardly toward one another to facilitate opening said clamp.

* * * * *